US010924980B2

(12) United States Patent
Kim

(10) Patent No.: US 10,924,980 B2
(45) Date of Patent: Feb. 16, 2021

(54) METHOD FOR DETERMINING VALIDITY OF SYSTEM INFORMATION BLOCK AND APPARATUS SUPPORTING SAME

(71) Applicant: LG Electronics Inc., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/494,684

(22) PCT Filed: Mar. 15, 2018

(86) PCT No.: PCT/KR2018/003028
§ 371 (c)(1),
(2) Date: Sep. 16, 2019

(87) PCT Pub. No.: WO2018/169319
PCT Pub. Date: Sep. 20, 2018

(65) Prior Publication Data
US 2020/0084694 A1    Mar. 12, 2020

Related U.S. Application Data

(60) Provisional application No. 62/471,967, filed on Mar. 16, 2017.

(51) Int. Cl.
*H04W 48/08* (2009.01)
*H04L 12/24* (2006.01)
*H04W 68/00* (2009.01)

(52) U.S. Cl.
CPC ......... *H04W 48/08* (2013.01); *H04L 41/0806* (2013.01); *H04W 68/005* (2013.01)

(58) Field of Classification Search
CPC ... H04W 48/08; H04W 68/005; H04W 36/00; H04L 41/0806
See application file for complete search history.

(56) References Cited

U.S. PATENT DOCUMENTS

2016/0234735 A1    8/2016   Kubota et al.

FOREIGN PATENT DOCUMENTS

EP         3294004        5/2015
KR       20120040230      4/2012
(Continued)

OTHER PUBLICATIONS

EP Supplementary Search Report in European Application No. EP18768440, dated Dec. 10, 2019, 12 pages.
(Continued)

*Primary Examiner* — Walter J Divito
(74) *Attorney, Agent, or Firm* — Fish & Richardson P.C.

(57) ABSTRACT

A method for determining the validity of a system information block (SIB) by a terminal in a wireless communication system, and an apparatus supporting the same. The method includes: receiving, from a serving cell, a first version index indicating a version of a first system information block; determining a valid sub index to be mapped to a terminal capability of the terminal, among a plurality of sub-indices configuring the first version index; and comparing a valid sub index of a second version index indicating a version of a second system information block stored in the terminal with a valid sub index of the first version index, so as to determine whether the version of the first system information block is identical to the version of the second system information block.

16 Claims, 11 Drawing Sheets

(56) References Cited

FOREIGN PATENT DOCUMENTS

| KR | 20160116341 | 10/2016 |
|----|-------------|---------|
| KR | 20170007433 | 1/2017 |
| KR | 20170029544 | 3/2017 |
| WO | WO2016/191955 | 12/2016 |

OTHER PUBLICATIONS

Ericsson, "Index based provisioning of system information in NR", R2-165550, 3GPP TSG-RAN WG2 #95, Goteborg, Sweden, Aug. 22-26, 2016, 3 pages.
MediaTek Inc., "Comparison of Methods for Stored System Information", R2-1701326, 3GPP TSG-RAN2 #97 Meeting, Athens, Greece, Feb. 13-17, 2017, 4 pages.
Samsung, "Way forward on index based approaches", R2-1700313, 3GPP TSG-RAN WG2 Meeting NR, Spokane, USA, Jan. 17-19, 2017, 6 pages.
3rd Generation Partnership Project; Technical Specification Group Radio Access Network; "Radio Resource Control (RRC); Protocol specification (Release 14)," 3GPP TS 25.331 V14.1.0, Dec. 30, 2016, 2290 pages.

METHOD FOR DETERMINING VALIDITY OF SYSTEM INFORMATION BLOCK AND APPARATUS SUPPORTING SAME

CROSS-REFERENCE TO RELATED APPLICATIONS

This application is a National Stage application under 35 U.S.C. § 371 of International Application No. PCT/KR2018/003028, filed on Mar. 15, 2018, which claims the benefit of U.S. Provisional Application No. 62/471,967 filed on Mar. 16, 2017. The disclosures of the prior applications are incorporated herein by reference in their entirety.

BACKGROUND

Technical Field

The present invention relates to a technology for identifying a version of a system information block based on characteristics of a terminal.

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

As the amount of data communication increases, on-demand system information (OSI) has been proposed. In the case of the on-demand system information, the UE can request system information from the cell, and the network receiving the request can transmit the requested system information to the UE. On this wise, discussions on utilizing radio resource efficiently are constantly fulfilled.

In addition, the system information may be divided into a minimum SI and other SI. The minimum SI may be broadcast periodically. The minimum SI may be provided through basic information required for initial access to the cell and information for periodically acquiring other SI broadcasts or on demand.

SUMMARY

Even if unnecessary information is changed in the terminal among the information included in the system information block, when the terminal requests and receives the transmission of the new version of system information block due to the change, the radio resource and power may be unnecessarily consumed.

According to an embodiment of the present invention, in a method for determining the validity of a system information block (SIB) by a terminal in a wireless communication system, provided is the method comprises the steps of: receiving, from a serving cell, a first version index indicating a version of a first system information block; determining a valid sub index to be mapped to a terminal capability of the terminal, among a plurality of sub-indices configuring the first version index; and comparing a valid sub index of a second version index indicating a version of a second system information block stored in the terminal with a valid sub index of the first version index, so as to determine whether the version of the first system information block is identical to the version of the second system information block.

The method may further comprise the step of determining that the second system information block is valid in the serving cell and applying the second system information block to the serving cell, when it is determined that the version of the first system information block is identical to the version of the second system information block.

The method may further comprise the step of requesting transmission of the first system information block to the serving cell, when it is determined that the version of the first system information block is different from the version of the second system information block.

A sub-index except for a valid sub-index of the first version index among the sub-indexes configuring the first version index may be different from a sub-index except for a valid sub-index of the second version index among the sub-indexes configuring the second version index.

The terminal capability may be determined by at least one of a service supported by the terminal, a version of the terminal, and a category of the terminal.

The first version index and the second version index may be each configured for a plurality of bits, and the valid sub index may be configured to indicate one or more numbers listed at a specific position in the plurality of bits according to the terminal capability.

The method may further comprises the step of receiving configuration information regarding a position in the column of the valid sub index corresponding to the terminal capability from the serving cell, before performing the step of determining the valid sub index.

The configuration information may be periodically received from the serving cell.

The configuration information may be provided for each system information block.

The first system information block may indicate a current version of the system information block that is valid in the changed serving cell, after a cell reselection procedure of the terminal is performed.

The first system information block may indicate a changed system information block, when the terminal receives a system information change notification from the serving cell.

According to another embodiment of the present invention, in a terminal for determining the validity of a system information block (SIB) in a wireless communication system, provided are the terminal comprising: a memory; a transceiver; and a processor coupled to the memory and the transceiver, and wherein the processor configured to: receive, from a serving cell, a first version index indicating a version of a first system information block, determine a valid sub index to be mapped to a terminal capability of the terminal, among a plurality of sub-indices configuring the first version index, and compare a valid sub index of a second version index indicating a version of a second system information block stored in the terminal with a valid sub index of the first version index, so as to determine whether the version of the first system information block is identical to the version of the second system information block.

The processor may be configured to determine that the second system information block is valid in the serving cell and apply the second system information block to the serving cell, when it is determined that the version of the first system information block is identical to the version of the second system information block.

The processor may be configured to request transmission of the first system information block to the serving cell, when it is determined that the version of the first system information block is different from the version of the second system information block.

A sub-index except for a valid sub-index of the first version index among the sub-indexes configuring the first version index may be different from a sub-index except for a valid sub-index of the second version index among the sub-indexes configuring the second version index.

By comparing the valid sub-indexes among the version indices of the system information block, it is possible to identify the version of the system information block without considering whether unnecessary information in the system information block is changed.

DETAILED DESCRIPTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present invention are not limited thereto.

Figure 1:
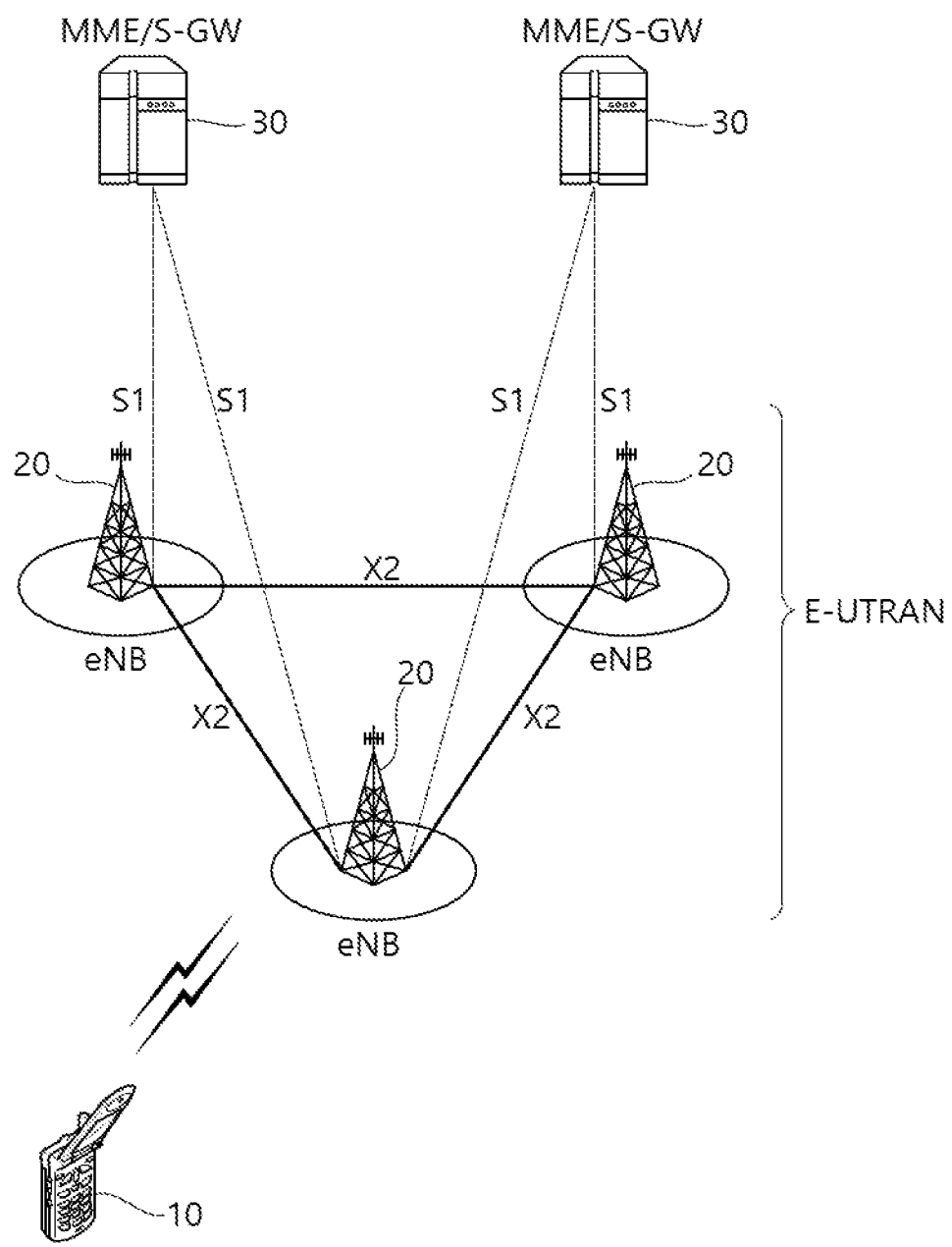
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW. The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE IDLE state management, ciphering of the user plane, SAE bearer control, and ciphering and integrity protection of NAS signaling.

Figure 2:
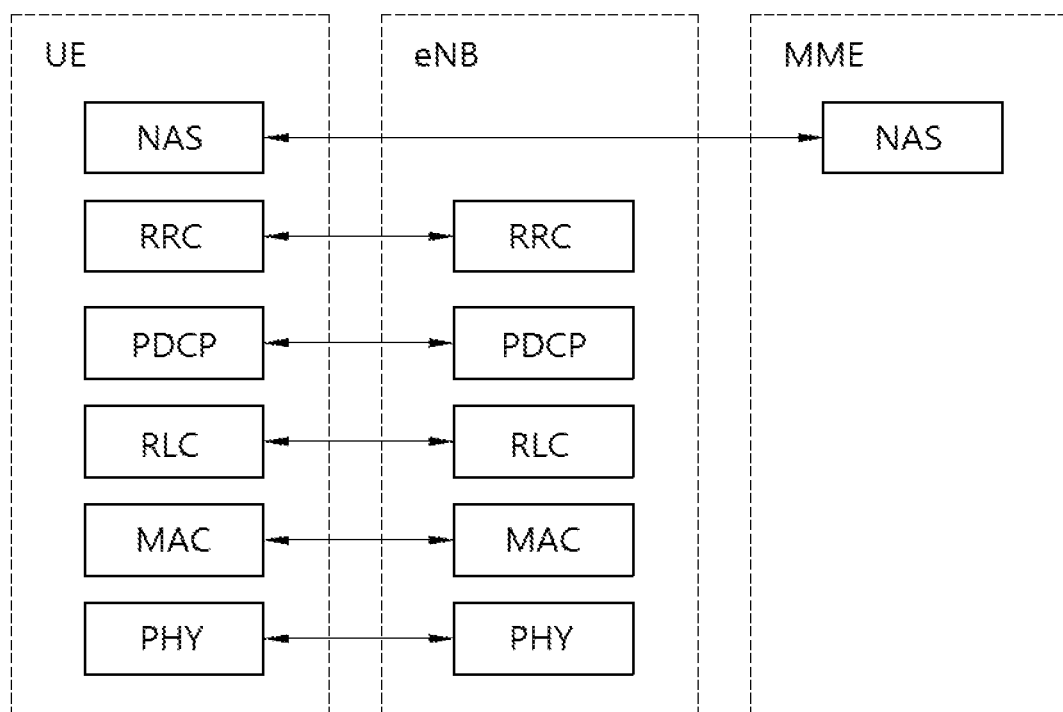
FIG. 2 shows a control plane of a radio interface protocol of an LTE system.
Figure 3:
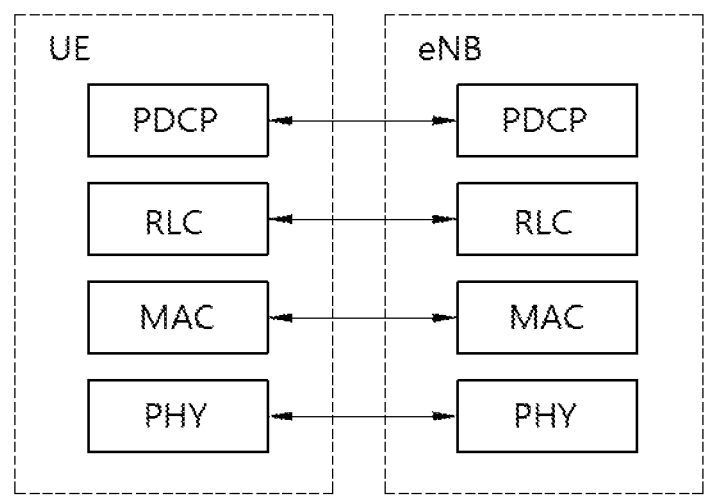
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3 and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE IDLE mobility handling, paging origination in LTE IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network structure is described.

Figure 4:
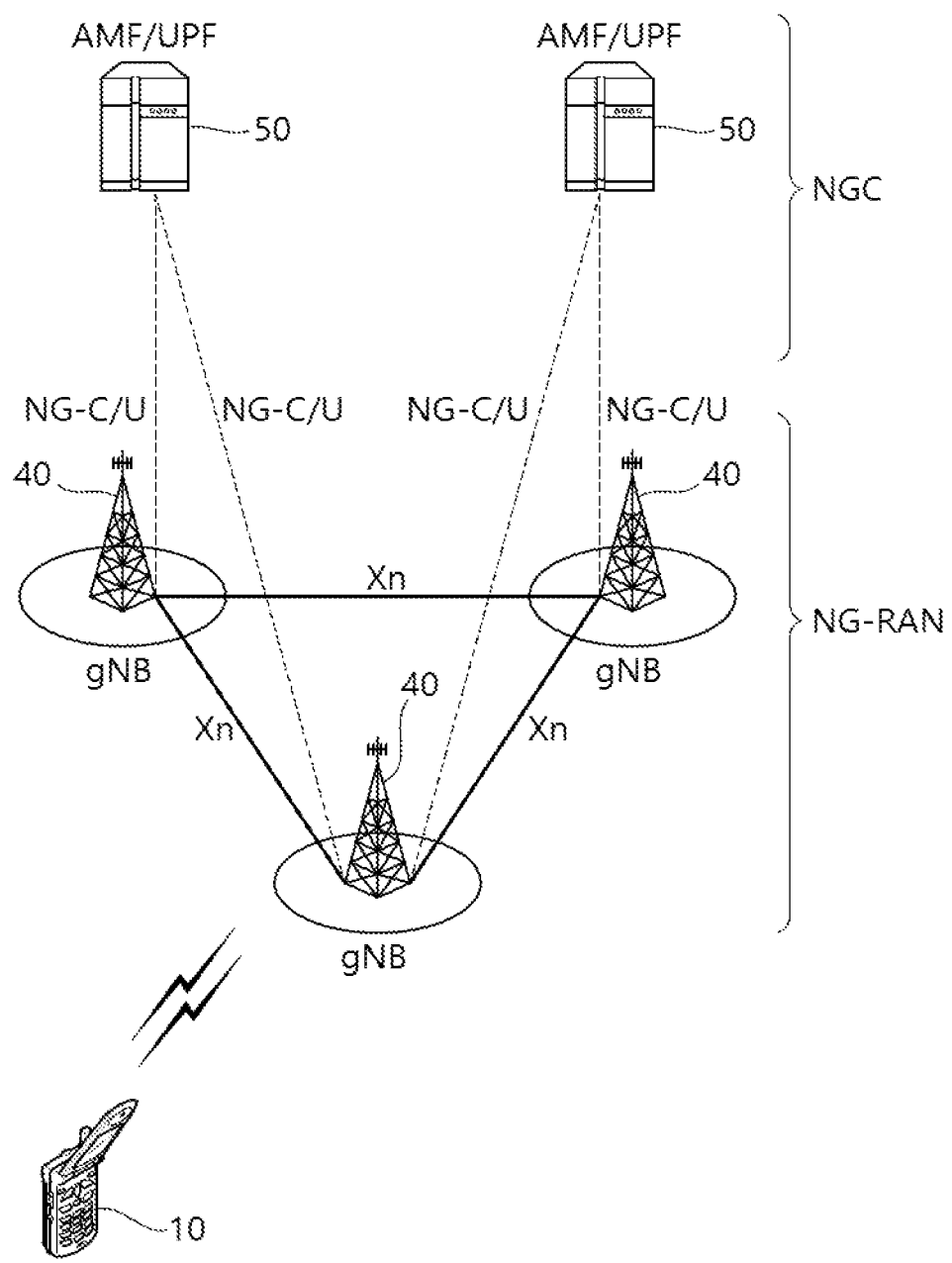
FIG. 4 shows a structure of 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, system information will be described.

Figure 5:
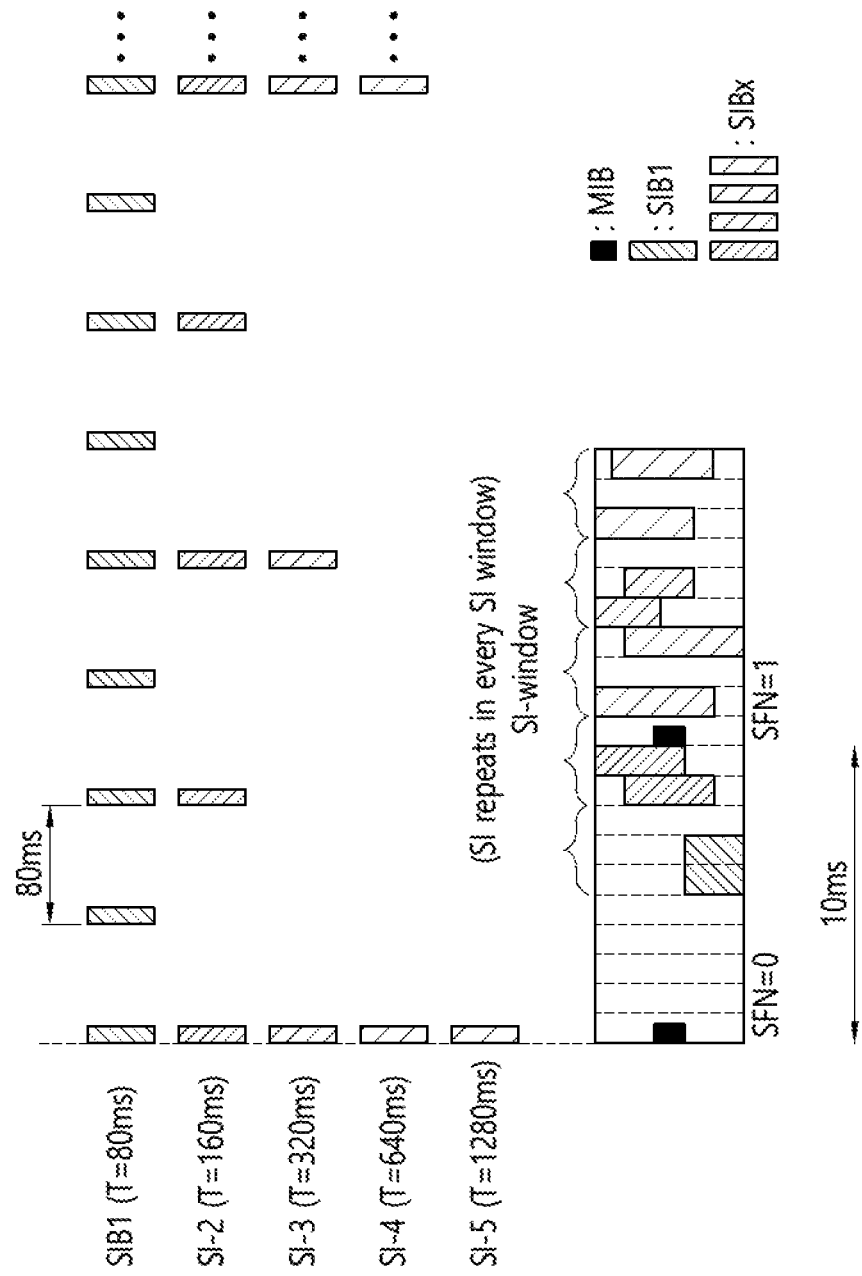
FIG. 5 shows an example of transmitting a master information block (MIB), a system information block1 (SIB1), and other SIBs.

FIG. 5 shows an example of transmitting a master information block (MIB), a system information block1 (SIB1), and other Ms.

An LTE cell broadcasts basic parameters necessary for an operation of an IDLE_MODE UE and a CONNECTED_MODE UE via a plurality of separate information blocks. Examples of the information blocks include an MIB, SIB1, SIB2, and other system information blocks (or SIBn).

The MIB includes the most essential parameters needed for a UE to access a cell. Referring to FIG. 5, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than the SIB1. SIBs having the same transmission periodicity among the SIBs other than the SIB1 are transferred via the same system information (SI) message. Thus, scheduling information includes a mapping relationship between each SIB and the SI message. The SI message is transmitted within an SI-window in a time domain, and each SI message is associated with one SI-window. Since SI-windows for different pieces of SI do not overlap, only one SI message is transmitted within any SI-window. Thus, scheduling information includes a length of the SI-window and an SI transmission periodicity. Time/frequency for transmitting the SI message is determined by dynamic scheduling of a BS. The SIB1 is broadcast through a downlink shared channel (DL SCH) according to a periodicity of eight radio frames (that is, 80-ms periodicity), and the SIB1 is repeatedly retransmitted on a fifth subframe of an SFN-mod-2 radio frame within the 80-ms periodicity.

SIB2 includes necessary information for a UE to access a cell. The SIB2 includes information on an uplink cell bandwidth, a random access parameter, a parameter related to uplink power control, or the like.

SIB3 includes cell reselection information. SIB4 includes frequency information on a serving cell and intra-frequency information on a neighboring cell related to cell reselection. SIB5 includes frequency information on a different E-UTRA frequency and inter-frequency information on a neighboring cell related to cell reselection. SIB6 includes frequency information on a UTRA frequency and information on a UTRA neighboring cell related to cell reselection. SIB7 includes frequency information on a GERAN frequency related to cell reselection. SIB8 includes information on a neighboring cell.

SIB9 includes a Home eNodeB (HeNB) identity (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 includes information related to GPS time and coordinated universal time (UTC). SIB17 includes RAN auxiliary information.

Not all SIBs are always required to be present. For example, the SIB9 is not needed in a mode in which a provider establishes an HeNB, and the SIB13 is not needed if a cell provides no MBMS.

System information is commonly applied to all UEs accessing a cell, and UEs need to always maintain up-to-date system information to perform an appropriate operation. When the system information is changed, the UEs need to know in advance the time at which the BS transmits new system information. In order that the BS and the UE mutually recognize a radio frame period for transmitting the new system information, the concept of BCCH modification period is introduced which is described below in detail.

Figure 6:
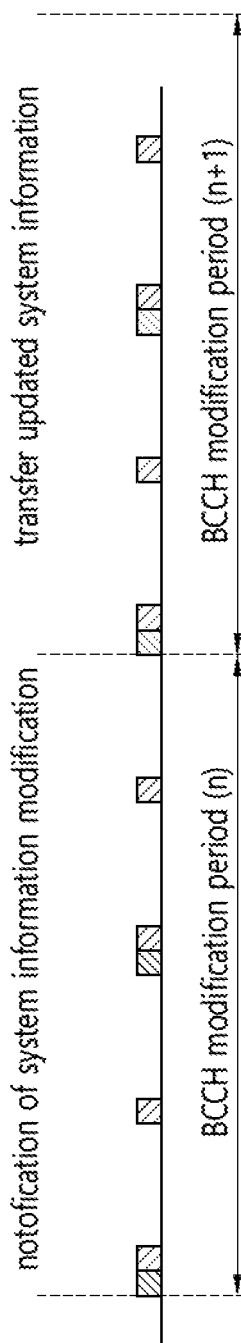
FIG. 6 shows an update of system information.

FIG. 6 shows an update of system information.

Referring to FIG. 6, a BS, which intends to update system information in an (n+1)th modification period, notifies in advance UEs of an update of system information in an nth modification period. A UE, which is notified of the update of the system information in the nth modification period, receives and applies new system information at the very beginning of the (n+1)th modification period. When the update of the system information is scheduled, the BS includes a system information modification indicator in a paging message. Generally, a paging message is a message received by an idle-mode UE. However, since the update of the system information is notified through the paging message, a connected-mode UE also needs to receive the paging message at times and to identify the update of the system information.

System information in NG-RAN (or new radio access technology) is described. As the amount of data communication increases, there is a continuous discussion for efficient use of radio resources. As part of this effort, on-demand system information (OSI) has been proposed. In the case of on-demand system information, the terminal may request system information from the cell, and the network receiving the request may transmit the requested system information to the terminal.

Figure 7:
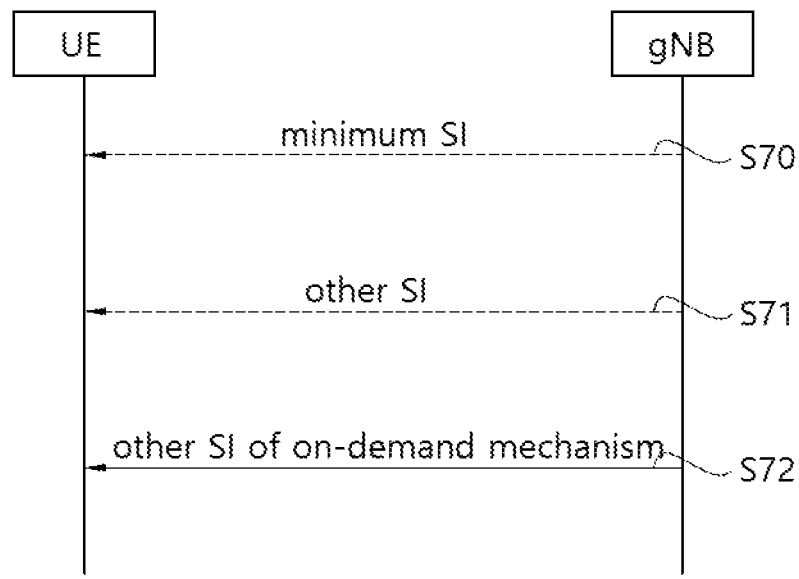
FIG. 7 shows transmission of system information.

FIG. 7 shows transmission of system information. System information can be divided into minimum SI and other SI. The minimum SI may be called another term, for example, a remaining SI. In step S70, the base station (e.g., gNB) may provide a minimum SI to the UE. The minimum SI may be broadcast periodically, and may be provided without further request. The minimum SI may be provided through basic information required for initial access to the cell and information for periodically acquiring other SI broadcasts or on demand. The minimum SI includes at least SFN, a list of PLMNs, cell IDs, cell camping parameters, and RACH parameters. If the network allows an on-demand mechanism, the parameters required to request other SI blocks (e.g., RACH preamble requests, if required) are included in the minimum SI. In step S72, the base station may send other SI to the UE. Other SIs may be broadcast periodically and optionally provided. Other SI includes everything that is not broadcast in the minimum SI. In the cell reselection procedure, neighbor cell information is considered as other SI. In S74, the other SI may be broadcast or provided in a dedicated manner by the network or upon request from the UE. The UE may request one or more SIs or all SIs (e.g., SIBs) in a single request. For other SIs required by the UE, before the UE transmits other SI requests, the UE needs to know whether the UE is available in the cell and whether it is broadcast. This may be done by examining a minimum SI that provides scheduling information for the other SI, including SIB type, validity information, SI periodicity, and SI-window information based on LTE. The scheduling information in the minimum SI includes an indicator indicating whether the corresponding SI-block is broadcast periodically or provided when needed. If the minimum SI indicates that the SIB is not broadcast, the UE does not assume that the SIB is broadcast periodically in the SI-window every SI period. Thus, the UE can send an SI request to receive this SIB. After the UE sends an SI request to receive the requested SIB, it monitors the SI window of the requested SIB in one or more SI cycles of that SIB Meanwhile, any one system information block may include a large amount of information. A particular terminal may only need some of the large amounts of information in the system information block. For example, if SIB2 including SSAC (specific service access barring) related information is provided in an LTE network, a terminal supporting Release 9 of 3GPP may require SSAC related information in SIB2. It is not necessary for supporting terminals. If only SSAC-related information of SIB2 is changed, the terminal supporting release 8 does not need to consider this change. However, even when unnecessary information is changed to a specific terminal among information included in SIB2, when the specific terminal receives a new SIB2 due to such a change, radio resources and power may be unnecessarily consumed.

Hereinafter, a method of identifying system information according to an embodiment of the present invention will be described.

A terminal according to an embodiment of the present invention may identify a version of the system information block by using only a valid sub-index corresponding to the terminal among the version indexes of the system information block. The version index of the system information block is an identifier indicating the version of the system information block. When a version of the system information block is changed as some of the information in the system information block is changed, a version index different from the existing system information block may be allocated to the changed system information block. Specifically, the terminal may identify information valid for the terminal according to the terminal capability in the system information block, and may check the version of the system information block based on the sub-index indicating the identified information. Here, the terminal capability may be determined according to a service and the like that the terminal can support. Specifically, the terminal capability may be determined according to the version of the release, the version of the terminal, the category of the terminal, the type of the terminal, and the like.

The version index of the system information block may be configured of a plurality of sub indexes. In addition, various pieces of information included in the system information block may be mapped to a plurality of sub indexes, respectively. The sub index may be given in a characteristic unit of information included in the system information block. In other words, different sub-indexes may be given to different information included in the system information block. The terminal may determine a valid sub-index corresponding to the terminal capability of the terminal among the sub-indexes, and may identify a version of the corresponding system information block only with the valid sub-index.

Figure 8:
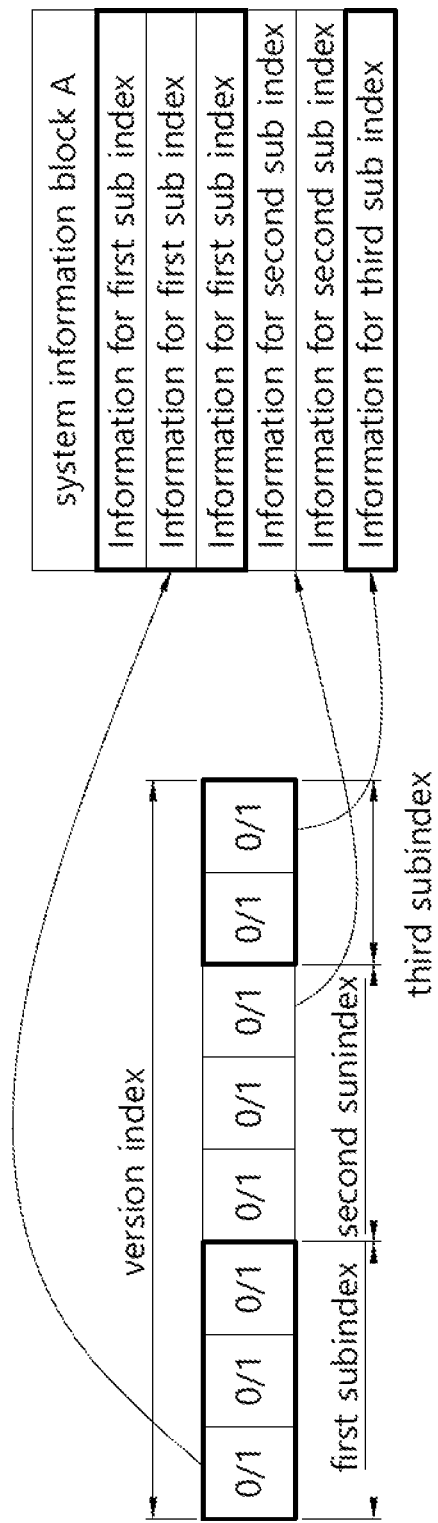
FIG. 8 shows a structure of a version index of a system information block according to an embodiment of the present invention.

FIG. 8 shows a structure of a version index of a system information block according to an embodiment of the present invention.

Referring to FIG. 8, the version index of the system information block A may be configured of a plurality of sub indexes. For example, the version index of the system block A may be 8 bits, and may be composed of three sub indexes (first sub index to third sub index). In addition, the first sub index and the second sub index may be 3 bits, and the third sub index may be 2 bits. However, the version index, the number of bits of each sub-index, and the number of sub-indexes according to an embodiment of the present invention are not particularly limited.

As illustrated in FIG. 8, the system information block may include information corresponding to the first sub index, information corresponding to the second sub index, and information corresponding to the third sub index. For example, the information corresponding to the first sub index may be information related to the release 8, the information corresponding to the second sub index may be information related to the release 9, and the information corresponding to the third sub index may be information related to the released 10. The terminal supporting only the release 8 may identify a version of the system information block using only the first sub-index. In the above example, the information corresponding to the second sub-index and the third sub-index is unnecessary information for the terminal supporting only the release 8. Therefore, even if the information corresponding to the second sub-index and the third sub-index of the system information block is changed, if the information corresponding to the first sub-index is identical to each other, the terminal supporting only the release 8 may determine that the versions of the system information block is identical to each other.

When the terminal capability of the terminal is mapped to only the first sub index, the terminal may decode only a portion of the system information block mapped to the first sub index. That is, the terminal cannot decode a portion mapped to the second sub index and the third sub index in the portion of the system information block. The terminal may determine that the first sub index is a valid sub index, and the second sub index and the third sub index are invalid sub indexes. The terminal may identify the version of the system information block using only the first sub-index (first to third bits). Referring to FIG. 8, the terminal may determine that a system information block having a version index of 00010101 and a system information block having a version index of 00001010 are the same version. This is because the value of the first sub index (first to third bits) valid for the terminal is the same as "000".

If the terminal capability of the terminal is mapped to the first sub index and the second sub index of the system information block, the terminal may use the first sub index (first to third bits) and the second sub index (fourth to sixth bits) to identify the version of the system information block. Referring to FIG. 8, the terminal may determine that a system information block having a version index of 00010101 and a system information block having a version index of 00001010 are different versions. This is because the values of the first sub index (the first to third bits) and the second sub index (the fourth to sixth bits) valid for the terminal are different from each other by "000101" and "000010", respectively. In addition, it may be determined that the system information block having the version index 00010101 and the system information block having the version index 00010110 are the same version. This is because the values of the first sub index (first to third bits) and the second sub index (fourth to sixth bits) valid for the terminal are the same as "000101".

If the terminal capability of the terminal is mapped to the first sub index, the second sub index, and the third sub index of the system information block, the terminal may identify the version of the system information block using all the sub indexes. In other words, when all sub indexes, that is, all version indexes is identical to each other, the terminal may consider the system information block as the same version.

The version index configuration information of the system information block may include information about a valid sub-index of the system information block for a specific terminal. The version index configuration information may be configured differently for each terminal and for each system information block. The version index configuration information of the system information block may include the following information.

Option 1: It is possible to map the characteristic or capability of the terminal to the valid bit. The terminal capability of the terminal may be determined according to the 3GPP release version, version of the terminal, category of the terminal, and the like. For example, the first bit may be mapped to information related to the release 8 and the second bit may be mapped to information related to the release 9. As another example, the second to fourth bits may be mapped to information related to the terminal category 1.

Option 2: It is possible to map the terminal capability of the terminal to the sub index. In this case, the sub index may be mapped to valid bits valid for the terminal among the bits configuring the version index. For example, a terminal supporting the release 1 may be mapped to the first sub index, and the first sub index may be mapped to the first to third bits of the bits configuring the version index.

The configuration information of the version index of the system information block may be broadcast periodically. That is, the configuration information of the version index may be treated as minimum system information periodically transmitted to the terminal without a separate request. In addition, configuration information of the version index of the system information block may be provided for each system information block.

Figure 9:
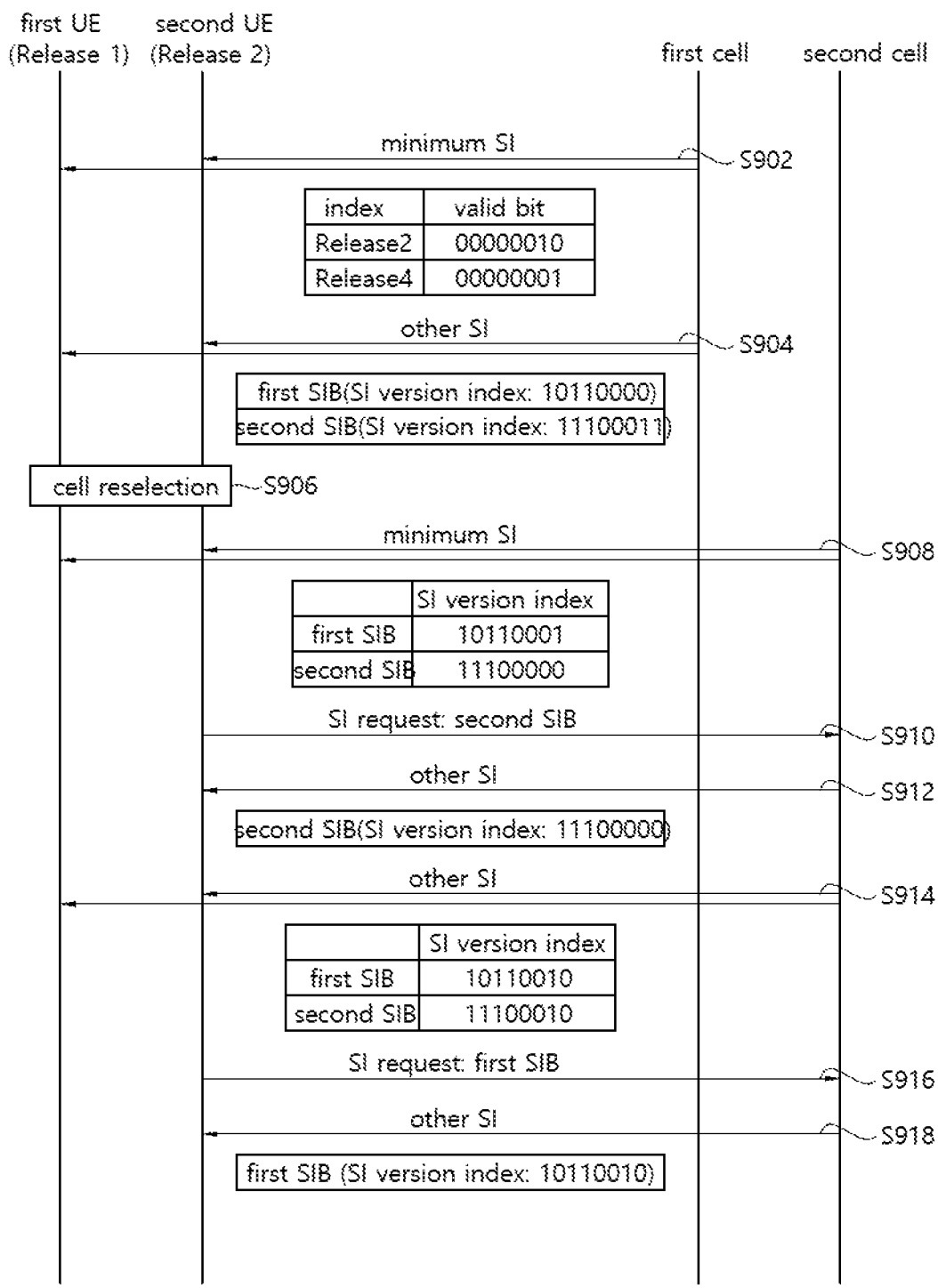
FIG. 9 is a flowchart illustrating a method of determining the validity of a system information block according to an embodiment of the present invention.

FIG. 9 is a flowchart illustrating a method of determining the validity of a system information block according to an embodiment of the present invention. In the present embodiment, the first terminal and the second terminal may be terminals supporting the release 1 and the release 2, respectively. The release 1 and the release 2 are not limited to 3GPP releases here. In addition, the first terminal and the second terminal may be staying in the initial first cell.

In step S902, the first terminal and the second terminal may receive minimum system information from a serving cell, that is, the first cell. The minimum system information may include version index configuration information of a system information block. According to an embodiment, the version index configuration information may indicate that an index of the system information block is configured for 8 bits, the 7th bit is associated with the release 2, and the 8th bit is associated with the release 4. In general, a terminal supporting the release 4 requires information associated with the release 2. On the other hand, the terminal supporting the release 2 does not require information associated with the release 4. Therefore, the version index configuration information may mean the following items.

The terminal supporting the release 1 may consider the first to sixth bits in the version index of the system information block as a valid sub-index.

The terminal supporting the release 2 or 3 may consider the first to seventh bits in the version index of the system information block as a valid sub-index.

The terminal supporting the release 4 may consider the first to eighth bits in the version index of the system information block as a valid sub-index.

In step S904, the first terminal and the second terminal may receive the first system information block SIB1 and the second system information block SIB2 together with the version index from the serving cell. In this case, the first system information block and the second system information block may be provided to the terminal at the request of the terminal as other system information (other SI). The first system information block and the second system information block may be, for example, SIB9 and SIB13, respectively. According to an embodiment, the version index of the first system information block transmitted to the first terminal may be "10110000". In this case, the first terminal may consider the version index of the first system information block as "101100XX" according to the version index configuration information received in S902. In other words, the first terminal may consider the first to sixth bits of the version index of the system information block as a valid sub-index for the first terminal, and may identify the version of the system information block by considering only the first to sixth regardless of the seventh to eighth bits. In addition, the version index of the second system information block transmitted to the first terminal may be "11100011". Similarly, the first terminal may consider the version index of the second system information block as "111000XX".

Meanwhile, the version index of the first system information block transmitted to the second terminal may be "10110000", and the second terminal may consider that a version index of the first system information block as "1011000X" according to the version index configuration information received in S902. In other words, the second terminal may consider the first to seventh bits of the version index of the system information block as a valid sub-index for the second terminal, and may identify the version of the system information block by considering only the first to seventh bits regardless of the eighth bit. In addition, the version index of the second system information block transmitted to the second terminal may be "11100011". Similarly, the second terminal may consider the version index of the second system information block as "1110001X".

In step S906, the first terminal and the second terminal may perform a cell reselection procedure. Accordingly, the first terminal and the second terminal may stay in the second cell.

In step S908, the first terminal and the second terminal may receive minimum system information from the changed serving cell, that is, the second cell. The minimum system information may include a version index of each system information block. The version index of the first system information block included in the minimum system information may be "10110001" and the version index of the second system information block may be "11100000". In this step, the first terminal and the second terminal may receive only the version index of each system information block, and may not receive each of the system information itself.

According to an embodiment, the first terminal may consider that the version index of the first system information block of the changed serving cell is "101100XX". This is because, according to the version index configuration information of the minimum system information received in step S902, the first terminal may consider that the first to sixth bits of the version index of the system information block are valid sub-indexes for the first terminal. Similarly, the first terminal may consider that the version index of the second system information block of the changed serving cell is "111000XX".

Meanwhile, the second terminal may consider that the version index of the second system information block of the changed serving cell is "1011000X". This is because, according to the version index configuration information of the minimum system information received in step S902, the second terminal may consider the first to seventh bits of the version index of the system information block as the valid sub-index for the first terminal. Similarly, the second terminal may consider that the version index of the second system information block of the changed serving cell is "1110000X".

The first terminal may determine that the first system information block and the second system information block received from the first cell and the first system information block and the second system information block received from the second cell are the same version.

In an embodiment, the version index of the first system information block received from the first cell is "10110000" and the version index of the first system information block received from the second cell is "10110001". In this case, the first terminal may compare the first to sixth bits of the version index of the first system information block received from the first cell and the first to sixth bits of the version index of the first system information block received from the second cell. Since the version index of each first system information block received from the first cell and the second cell are both "101100XX", the first terminal may determine that the versions of each first system information block is identical to each other.

In addition, the version index of the second system information block received from the first cell is "11100011" and the version index of the second system information block received from the second cell is "11100000". In this case, the first terminal may compare the first to sixth bits of the version index of the second system information block received from the first cell and the first to sixth bits of the version index of the second system information block received from the second cell. Since the version index of each second system information block received from the first cell and the second cell are both "111000XX", the first terminal may determine that the versions of each second system information blocks is identical to each other Accordingly, the first terminal may know that the first system information block and the second system information block received from the first cell are also valid in the second cell. Accordingly, the first terminal may maintain the first system information block and the second system information block received from the first cell and apply the first system information block and the second system information block to the second cell.

Meanwhile, the second terminal may determine that the first system information block received from the first cell and the first system information block received from the second cell are the same version. The version index of the first system information block received from the first cell is "10110000" and the version index of the first system information block received from the second cell is "10110001". In this case, the second terminal may compare the first to seventh bits of the version index of the first system information block received from the first cell and the first to seventh bits of the version index of the first system information block received from the second cell. Since the version index of each first system information block received from the first cell and the second cell is both "1011000X", the second terminal may determine that the versions of each first system information block is identical to each other.

However, the second terminal may determine that the second system information block received from the first cell and the second system information block received from the second cell are different versions. The version index of the second system information block received from the first cell is "11100011" and the version index of the second system information block received from the second cell is "11100000". In this case, the second terminal may compare the first to seventh bits of the version index of the second system information block received from the first cell and the first to seventh bits of the version index of the second system information block received from the second cell. Since the version index of the second system information block received from the first cell is "1110001X" and the version index of each second system information block received from the second cell is "1110000X", the second terminal may determine that the version of the second system information block received from the first cell and the second system information block received from the second cell is different from each other.

If the second terminal has a second system information block having a version index of "1110000X", the second system information block may be used. However, if the second terminal does not have the second system information block having the version index "1110000X", the transmission of the second system information block having the version index "1110000X" to the second cell may be requested.

In step S910, the second terminal may request transmission of a second system information block having a version index of "1110000X" (e.g., a system information block having a version index of 11100000) to the second cell. In step S912, the second terminal may request the second system information block having a version index of "1110000X" to the second cell, and then the second terminal may apply the second system information block having a received version index of "1110000X" to the second cell.

In step S914, the first terminal and the second terminal may receive a system information change notification from the second cell. The system information change notification may indicate that the first system information block is changed from a version having a version index of "10110001" to a version having a version index of "10110010". In addition, the system information change notification may indicate that the second system information block is changed from a version having a version index of "11100000" to a version having a version index of "11100010".

The first terminal may determine that the first system information block and the second system information block are not changed. Specifically, the first terminal may compare the first to sixth bits of the version index of the first system information block and the second system information block to identify the version of the system information block. Accordingly, the first terminal may consider both the version index 10110001 of the first system information block before the change and the version index 10110010 of the first system information block after the change as "101100XX". In addition, the first terminal may consider both the version index 11100000 of the second system information block before the change and the version index 11100010 of the second system information block after the change as "111000XX".

In contrast, the second terminal may determine that the first system information block and the second system information block have been changed. Specifically, the second terminal may compare the first to seventh bits of the version index of the first system information block and the second system information block to identify the version of the system information block. According to an embodiment, since the version index 10110001 of the first system information block before the change and the version index 10110010 of the first system information block after the change are different from each other as "1011000X" and "1011001X", according to an embodiment of the present invention, the first system information block may be determined to have changed. Therefore, the second terminal should receive the changed first system information block from the second cell. Also, the second terminal may determine that the version index 11100000 of the second system information block before the change and the version index 11100010 of the second system information block after the change are different from each other as "1110000X" and "1110001X". However, in step S904, the second terminal has already received the system information block having a version index of "11100011" from the first cell. Since the second cell considers the version index "11100010" and the version index "11100011" to be the same, the system information block having a version index "11100011" which is already stored may be applied to the second cell.

In step S916, the second terminal may request transmission of the first system information block to the second cell. Specifically, the second terminal may request the first cell of the first system information block having a version index of "1011001X" to the second cell. In step S918, the second terminal may receive the first system information block having a version index of "1011001X" from the base station and apply it to the second cell.

Figure 10:
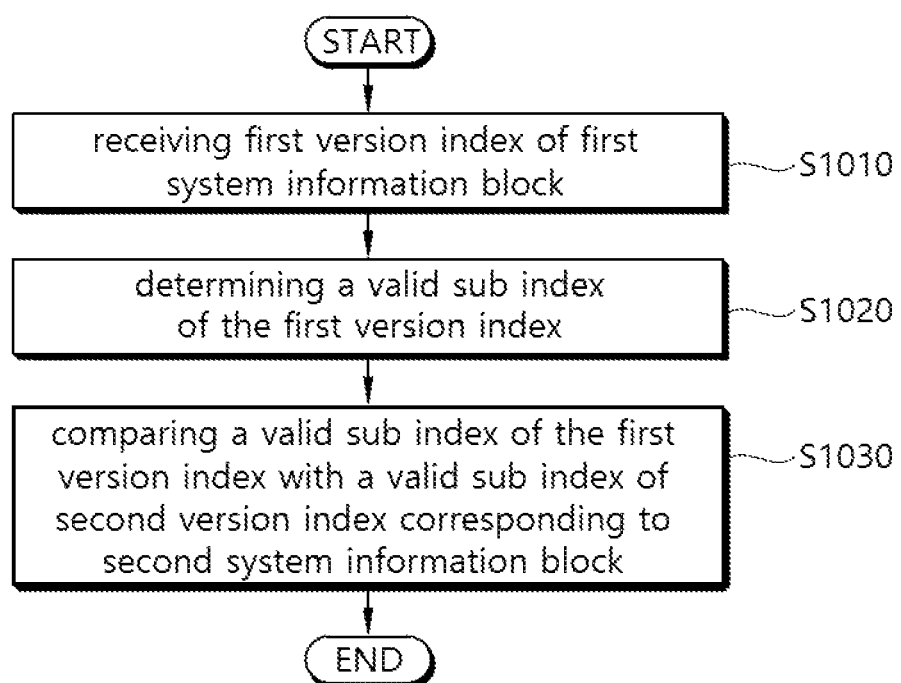
FIG. 10 is a flowchart illustrating a method of determining the validity of a system information block according to an embodiment of the present invention.

FIG. 10 is a flowchart illustrating a method of determining the validity of a system information block according to an embodiment of the present invention.

In step S1002, the terminal may receive a first version index indicating a version of the first system information block from the serving cell. In step S1004, the terminal may determine a valid sub-index mapped to the terminal capability of the terminal among the plurality of sub-indexes configuring the first version index. In step S1006, the terminal may compare the valid sub-index of the second version index indicating the version of the second system information block stored in the terminal with the valid sub-index of the first version index, to determine whether the version of the first system information block and the versions of the second system information block is identical to each other.

If it is determined that the version of the first system information block and the version of the second system information block is identical to each other, the terminal may determine that the second system information block is valid in the serving cell to apply the second system information block to the serving cell. If it is determined that the version of the first system information block is different from the version of the second system information block, the terminal may request transmission of the first system information block to the serving cell. The sub-index except for a valid sub-index of the first version index among the sub-indexes configuring the first version index may be different from the sub-index except for a valid sub-index of the second version index among the sub-indexes configuring the second version index. The terminal capability may be determined by at least one of a service supported by the terminal, a version of the terminal, and a category of the terminal. Each of the first version index and the second version index may be configured for a plurality of bits, and the valid sub-index may be configured to indicate one or more numbers listed at a specific position in the plurality of bits according to the terminal capability. The terminal may receive, from the serving cell, configuration information regarding a position in the column of the valid sub index corresponding to the terminal capability before the step of performing the determining of the valid sub index. The configuration information may be periodically received from the serving cell. The configuration information may be provided for each system information block. The first system information block may indicate a current version of the system information block valid in the changed serving cell, after performing the cell reselection procedure of the terminal. The first system information block may indicate a changed system information block when the terminal receives a system information change notification from the serving cell.

Figure 11:
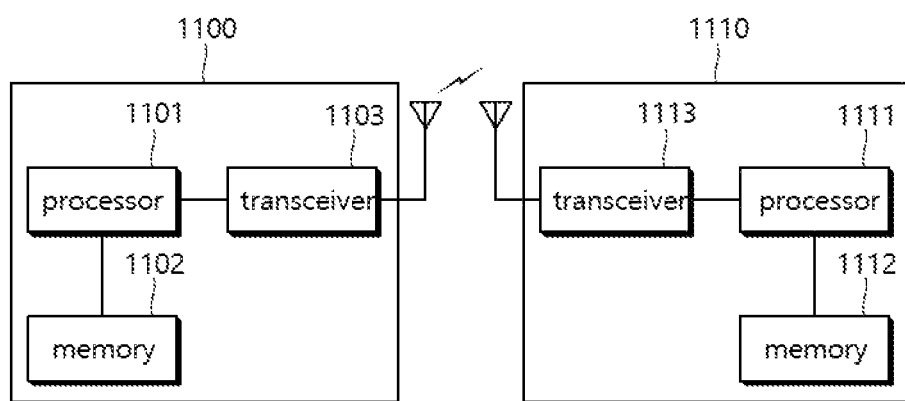
FIG. 11 is a block diagram illustrating a wireless apparatus in which an embodiment of the present invention can be implemented.

FIG. 11 is a block diagram illustrating a wireless apparatus in which an embodiment of the present invention can be implemented.

A BS 1100 includes a processor 1101, a memory 1102, and a radio frequency (RF) unit 1103. The memory 1102 is coupled to the processor 1101, and stores a variety of information for driving the processor 1101. The RF unit 1103 is coupled to the processor 1101, and transmits and/or receives a radio signal. The processor 1101 implements the proposed functions, procedures, and/or methods. In the aforementioned embodiments, an operation of the BS may be implemented by the processor 1101.

A UE 1110 includes a processor 1111, a memory 1112, and an RF unit 1113. The memory 1112 is coupled to the processor 1111, and stores a variety of information for driving the processor 1111. The RF unit 1113 is coupled to the processor 1111, and transmits and/or receives a radio signal. The processor 61 implements the proposed functions, procedures, and/or methods. In the aforementioned embodiments, an operation of the UE 1110 may be implemented by the processor 1111.

The processors 1111 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for determining the validity of a system information block (SIB) by a terminal in a wireless communication system, the method comprises the steps of:
   receiving, from a serving cell, a first version index related to a version of a first system information block, wherein a second system information block is stored in the terminal, and a second version index is related to a version of the second system information;
   determining a valid sub index of the first version index and a valid sub index of the second version index, wherein the valid sub index is composed of a plurality of bits among bits of the version index; and
   comparing the valid sub index of the second version index with the valid sub index of the first version index, so as to determine whether the second system information block stored in the terminal is valid.

2. The method of claim 1, further comprising determining that the second system information block is valid in the serving cell and applying the second system information block to the serving cell, when it is determined that the version of the first system information block is identical to the version of the second system information block.

3. The method of claim 1, further comprising requesting transmission of the first system information block to the serving cell, when it is determined that the version of the first system information block is different from the version of the second system information block.

4. The method of claim 1, wherein a sub-index except for a valid sub-index of the first version index among the sub-indexes configuring the first version index is different from a sub-index except for a valid sub-index of the second version index among the sub-indexes configuring the second version index.

5. The method of claim 1, wherein the valid sub index is mapped to a terminal capability of the terminal, and the terminal capability is determined by at least one of a service supported by the terminal, a version of the terminal, and a category of the terminal.

6. The method of claim 1, wherein the first version index and the second version index are each configured for a plurality of bits, and
   the valid sub index is configured to indicate one or more numbers listed at a specific position in the plurality of bits according to the terminal capability.

7. The method of claim 6, further comprising receiving configuration information regarding a position in the column of the valid sub index corresponding to the terminal capability from the serving cell, before performing the step of determining the valid sub index.

8. The method of claim 7, wherein the configuration information is periodically received from the serving cell.

9. The method of claim 7, wherein the configuration information is provided for each system information block.

10. The method of claim 1, wherein the first system information block indicates a current version of the system information block that is valid in the changed serving cell, after a cell reselection procedure of the terminal is performed.

11. The method of claim 1, wherein the first system information block indicates a changed system information block, when the terminal receives a system information change notification from the serving cell.

12. The method of claim 1, wherein the terminal communicates with at least one of a mobile terminal, a network or autonomous vehicles other than the terminal.

13. A terminal for determining the validity of a system information block (SIB) in a wireless communication system, comprising:
   a memory;
   a transceiver; and
   a processor coupled to the memory and the transceiver, and
   wherein the processor configured to:
   receive, from a serving cell, a first version index related to a version of a first system information block, wherein a second system information block is stored in the terminal, and a second version index is related to a version of the second system information;

determine a valid sub index of the first version index and a valid sub index of the second version index, wherein the valid sub index is composed of a plurality of bits among bits of the version index; and compare the valid sub index of the second version index with the valid sub index of the first version index, so as to determine whether the second system information block stored in the terminal is valid.

14. The terminal of claim 13, wherein the processor further configured to determine that the second system information block is valid in the serving cell and apply the second system information block to the serving cell, when it is determined that the version of the first system information block is identical to the version of the second system information block.

15. The terminal of claim 13, wherein the processor further configured to request transmission of the first system information block to the serving cell, when it is determined that the version of the first system information block is different from the version of the second system information block.

16. The terminal of claim 13, wherein a sub-index except for a valid sub-index of the first version index among the sub-indexes configuring the first version index is different from a sub-index except for a valid sub-index of the second version index among the sub-indexes configuring the second version index.

* * * * *